United States Patent
Onderko et al.

(10) Patent No.: US 6,554,883 B1
(45) Date of Patent: Apr. 29, 2003

(54) POWDERED METAL GEAR TEETH

(75) Inventors: Joseph Onderko, Stow, OH (US); Joseph Jocke, Grafton Township, OH (US); Eric Labus, Brunswick, OH (US)

(73) Assignee: MTD Products Inc., Valley City, OH (US)

( * ) Notice: Subject to any disclaimer, the term of this patent is extended or adjusted under 35 U.S.C. 154(b) by 0 days.

(21) Appl. No.: 09/455,618

(22) Filed: Dec. 7, 1999

(51) Int. Cl.$^7$ ............................................... B22F 5/08
(52) U.S. Cl. ................................... 75/232; 419/38
(58) Field of Search ................... 428/548; 75/228; 419/38

(56) References Cited

U.S. PATENT DOCUMENTS

| | | | | |
|---|---|---|---|---|
| 4,217,320 A | * | 8/1980 | Ezis et al. ................. | 264/65 |
| 5,390,414 A | * | 2/1995 | Lisowsky ................. | 29/893.34 |
| 5,759,081 A | * | 6/1998 | Lyman ..................... | 446/103 |
| 5,772,748 A | | 6/1998 | Hubbard .................. | 106/38.27 |
| 6,134,786 A | * | 10/2000 | Graupner et al. ........ | 29/893.35 |
| 6,148,685 A | * | 11/2000 | Cadle et al. .............. | 74/457 |

OTHER PUBLICATIONS

Article: How P/M Parts are Made.

* cited by examiner

Primary Examiner—Daniel J. Jenkins

(74) Attorney, Agent, or Firm—Brouse McDowell; Roger D. Emerson; Timothy D. Bennett

(57) ABSTRACT

A gear tooth has a main body and a lead-in portion for use in receiving the lead-in portion of a corresponding gear tooth on another gear. The main body may include first and second ends and first and second sides. The sides may form first and second protrusions with the first end. The lead-in portion may include first and second side walls extending from the first end of the main body and first and second sliding surfaces extending from the first and second side walls respectively. The first sliding surface lies on a first plane. The first side wall defines a first shelf on the first end of the main body. The first protrusion, the first shelf and the first side of the main body are all positioned between the first plane and an axial centerline of the main body. To form a gear, powdered metal is added to a gear mold. The powdered metal is then compacted within the gear mold. Next, a green gear is formed. The green gear has a plurality of teeth each having at least one tool shut off shelf. Each tool shut off shelf is adapted to not interfere with a similarly formed gear in sliding engagement. Finally, the green gear is sintering (heated) so that the powdered metal of the green part solidifies into a single mass. This method removes the otherwise required step of removing the tool shut off shelves on the gear teeth. According to another embodiment, the tool shut off shelves and side walls can be reduced in size to the point where they are substantially eliminated.

15 Claims, 6 Drawing Sheets

POWDERED METAL GEAR TEETH

BACKGROUND OF THE INVENTION

1. Field of Invention

This invention pertains to the art of methods and apparatuses for forming gears, and more specifically to methods and apparatuses for forming a sliding gear with powder metallurgy (PM).

2. Description of the Related Art

Powder metallurgy (PM) is a known method for fashioning metal parts. The PM process utilizes powdered metal that is added to a mold and then compacted under very high pressures, usually above 20 tons per square inch. The resultant part comes out of the mold as a "green" part. The PM process is completed by sintering the "green" part in a furnace, usually at temperatures between 2000° and 2500° F. The sintering process essentially welds together the compacted powdered metal of the green part into a solid mass.

Powder metallurgy (PM) has proven to provide advantages over prior methods of forming metal parts especially in the area of cost efficiency. There is a problem, however, related to the requirement for tool shut off shelves (also known as a PM chamfers). These shelves are known to be required because the tools used in forming the part must be terminated perpendicular to the direction of tool movement. The problem in the use of PM to form gears is that the tool shut off shelves interfere with the intermeshing of the gear teeth.

To illustrate this problem, FIG. 5 shows a top view of a pair of sliding gear teeth 10, 10 made in accordance with a known PM process. Each tooth includes sliding surfaces 20 that are intended to slide against one another as the teeth slidingly intermesh. Each tooth also has tool shut off shelves 14 as known PM processes require. The problem is that the shut off shelves 14 form protrusions 26 that prevent the proper intermeshing of gear teeth 10 because the protrusions 26 of one tooth physically interfere with the opposite tooth as one gear slides toward the other gear. One possible way to alleviate this problem is to remove the protrusions 26 such as by machining them off the teeth 10. This is an expensive and undesirable extra operation in the manufacturing process. For this reason the PM process is not known to be used in forming gears having slidingly intermeshing gear teeth.

The present invention provides methods and apparatuses for forming sliding gears using the PM process without any such extra step. The difficulties inherent in the related art are therefore overcome in a way that is simple and efficient, while providing better and more advantageous overall results.

SUMMARY OF THE INVENTION

According to one aspect of this invention, a gear tooth is provided that has a main body and a lead-in portion. The lead-in portion is used to receive a lead-in portion of a corresponding gear tooth on another gear. The main body includes first and second ends and first and second sides. The sides form first and second protrusions, respectively, with the first end. The lead-in portion includes first and second side walls extending from the first end of the main body and first and second sliding surfaces extending from the first and second side walls respectively. The first sliding surface lies on a first plane. The first side wall defines a first shelf on the first end of the main body. What is especially to be noted is that the first protrusion, the first shelf and the first side of the main body are all positioned between the first plane and the main body's axial centerline CL.

According to anther aspect of this invention, a method of forming a gear is provided. First, powdered metal is added to a gear mold. The powdered metal is then compacted within the gear mold. Next, a green gear is formed. The green gear has one tool shelf around the perimeter of the gear. Thus each of the gear teeth has a tool shut off shelf. Each of these tool shut off shelves are adapted to not interfere with a similarly formed gear in sliding engagement. Finally, the green gear is sintered (heated) so that the powdered metal of the green part fully solidifies into a single mass. It should be noted that this method removes the currently required step of removing the tool shut off shelves on the gear teeth.

According to still another aspect of this invention, the tool shut off shelves and side walls can be reduced in size to the point where they are substantially eliminated. Thus, no interference problems are encountered during sliding intermeshing with another similarly formed gear.

One advantage of the current invention is that the gear teeth easily slide over each other and thereby properly mesh.

Another advantage of the current invention is that the current invention allows these desirable gear teeth to be produced by the inexpensive and cost efficient process of powder metallurgy.

Another advantage of the current invention is that the undesirable step of machining or otherwise reducing the protrusions formed on gear teeth in the powdered metallurgy process is removed.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part hereof and wherein.

DESCRIPTION OF THE PREFERRED EMBODIMENT

Figure 1:
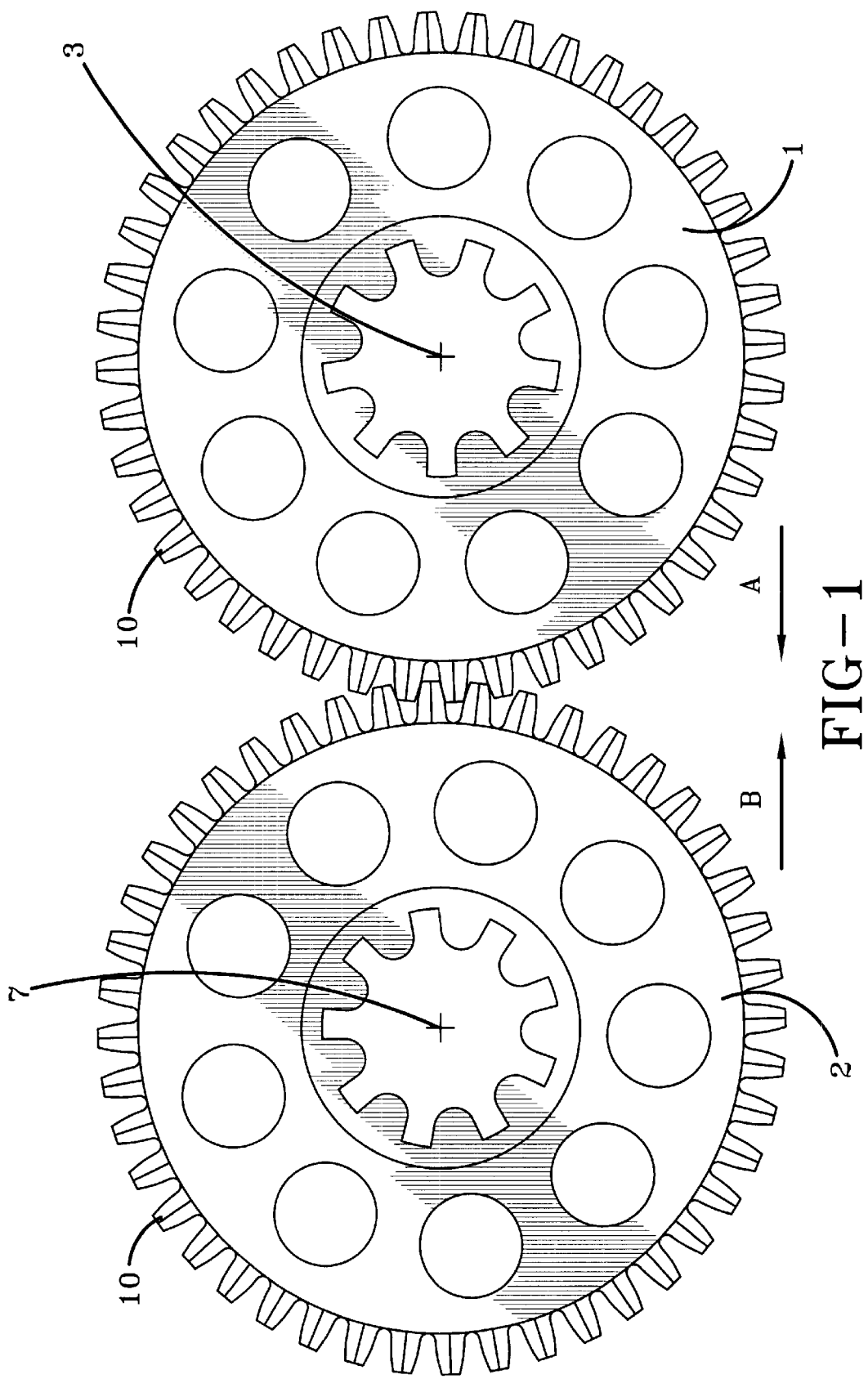
FIG. 1 is a side view of two inventive meshed gears.
Figure 2:
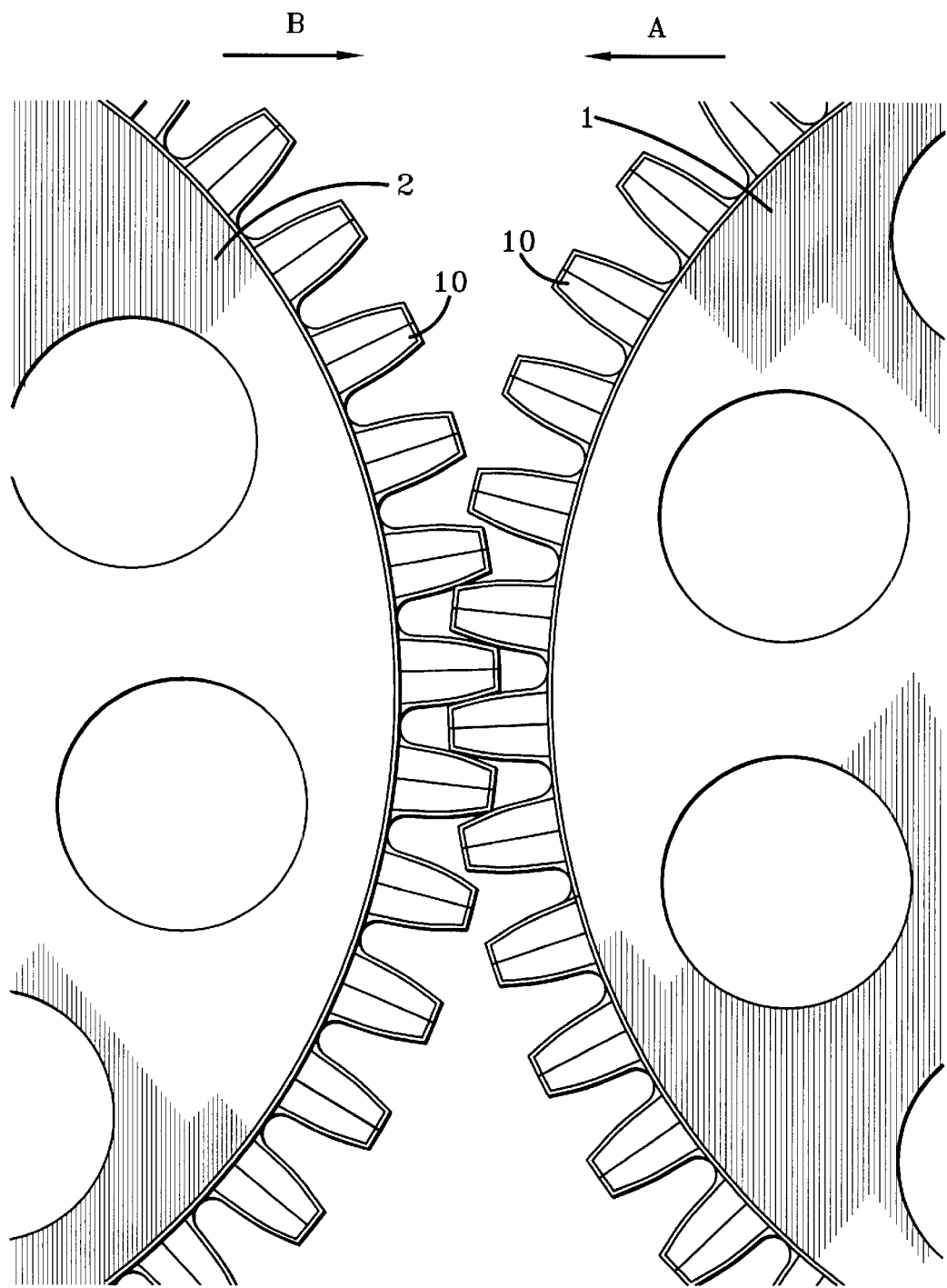
FIG. 2 is a magnified view of a portion of the two meshed gears of FIG. 1 showing the engagement of the gear teeth.

With reference to FIGS. 1 and 2, a pair of gears is shown. A first gear 1 is operatively connected to a second gear 2 by way of meshing gear teeth 10. The teeth 10 may become meshed as the first gear 1 and second gear 2 are brought together as indicated by arrows A and B. Alternatively, the teeth 10 of the gears may become meshed as first gear 1 slides along its axis 3 and/or second gear 2 slides along it's axis 7. Gears that connect in this way are known as sliding gears.

Figure 3:
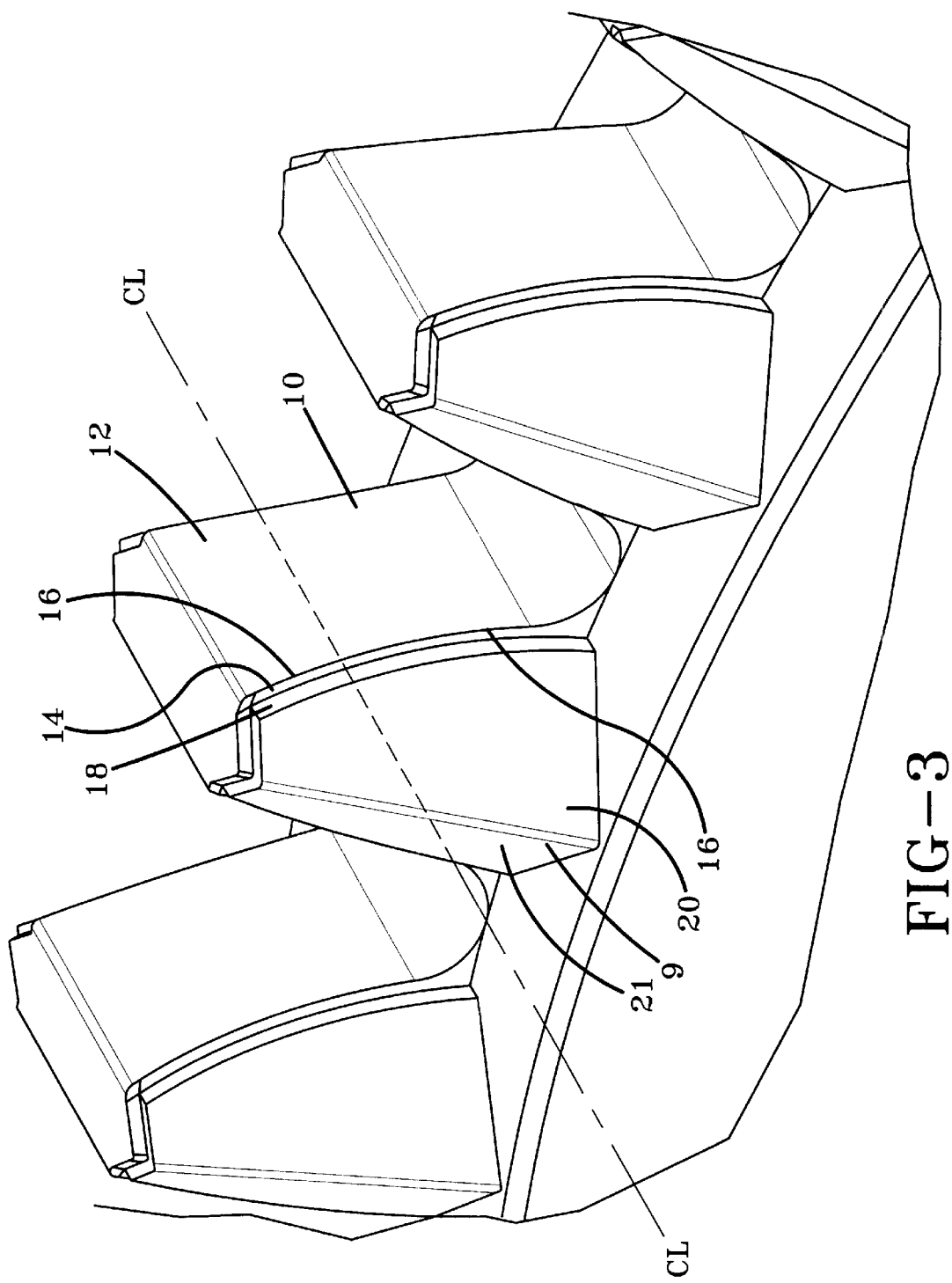
FIG. 3 is a magnified perspective view showing the inventive gear teeth.
Figure 4:
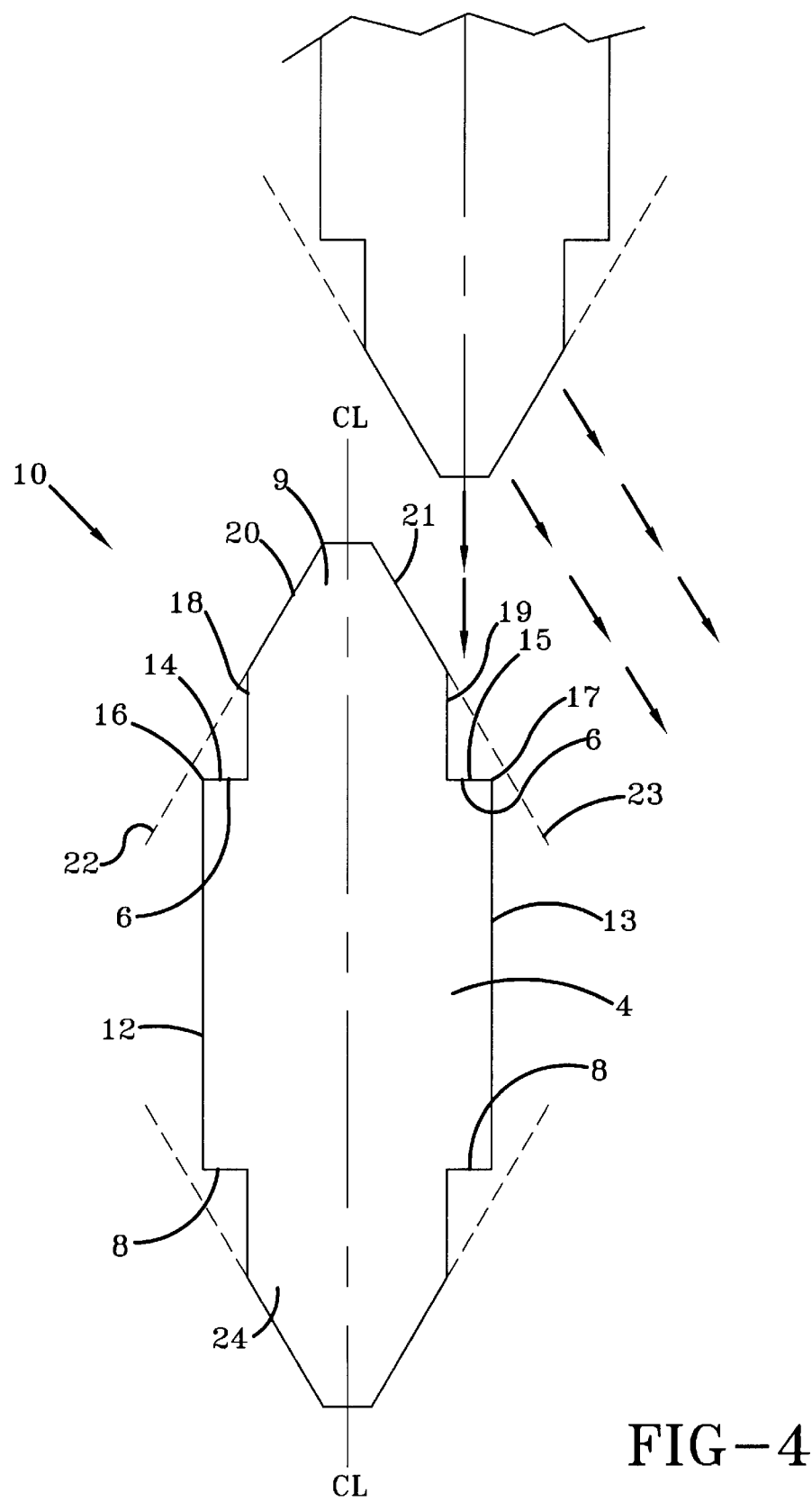
FIG. 4 is a top view showing schematically two gear teeth just prior to sliding engagement.
Figure 5:
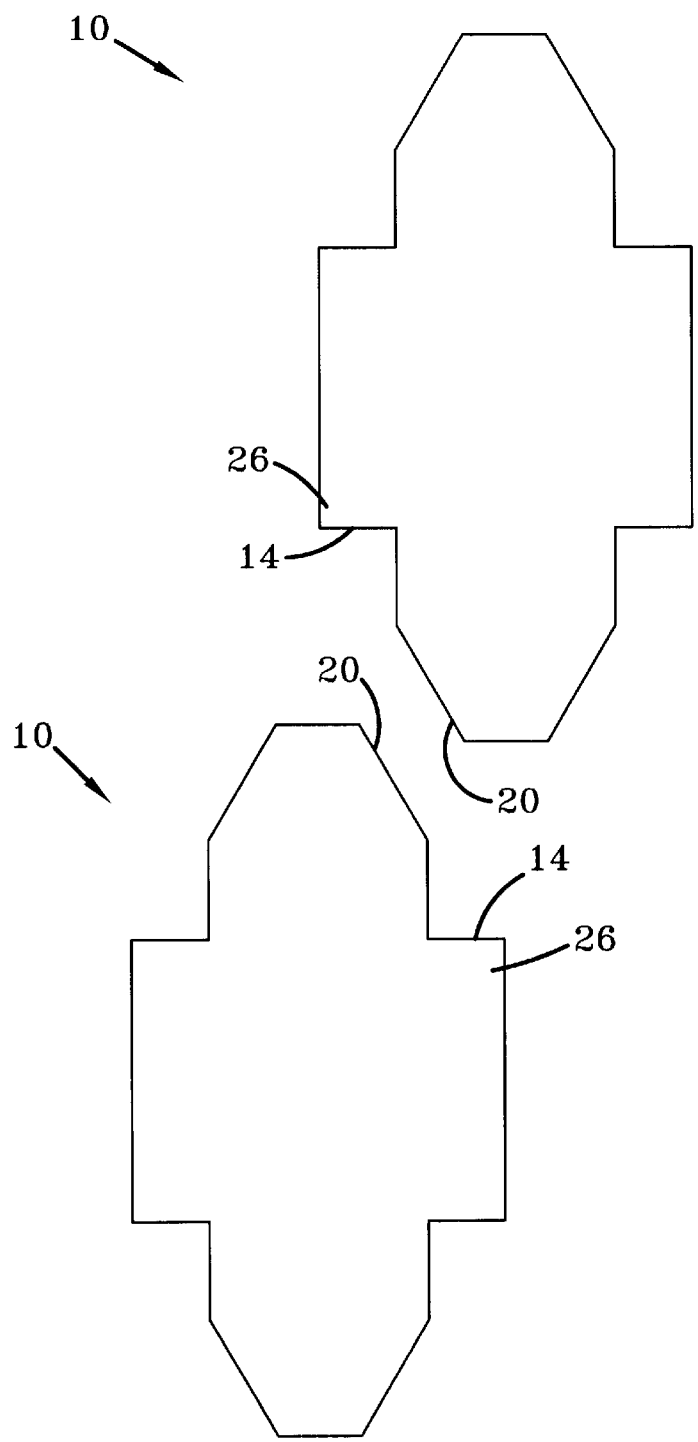
FIG. 5 is a top view showing schematically two gear teeth known in the prior art.

With reference to FIGS. 3 and 4; each gear tooth 10 has a main body 4 including first 6 and second 8 ends as well as first 12 and second 13 sides. To facilitate the sliding connection of the teeth 10 of the first gear 1 with the teeth 10 of the second gear 2, each gear tooth 10 includes at least a first lead-in portion 9. As shown, the first lead-in portion 9 may include first 18 and second 19 side walls that extend from the first end 6 of the main body 4. The first lead-in portion 9 also includes first 20 and second 21 sliding surfaces that extend from the first 18 and second 19 side walls respectively. The, first sliding surface 20 lies on a first plane 22 and the second sliding surface 21 lies on a second plane 23. These sliding surfaces facilitate the intermeshing of teeth 10 by allowing the teeth to slide over each other and align as first gear 1 and/or second gear 2 are slid along their respective axes 3, 7. It should be noted that the gear tooth may also have a second lead-in 24 if the corresponding gear slidably meshes with another gear in the axially opposite direction.

With continuing reference to FIGS. 3 and 4, the first side wall 18 may define a first tool shut off shelf 14 on the first end 6 of the main body 4. Similarly, the second wall 19 may define a second tool shut off shelf 15 on the first end 6 of the main body 4. The first 12 and second 13 sides form first 16 and second 17 protrusions with the first end 6. These protrusions are the outermost edge of the tool shut off shelves 14, 15 and are the.portions of the shelves most likely to create interference problems with the sliding gear process as described above. However, what should be especially noted is that the first protrusion 16, the first shelf 14, and the first side 12 of the main body 4 of the gear tooth 10 are all positioned between the first plane 22 and an axial centerline CL of the main body 4. Furthermore, this positioning of the first protrusion 16 is acquired as the gear is removed from the mold (not shown) within which it is formed. Thus, the otherwise required extra step of machining or otherwise reducing the protrusion 16 after molding is not required. Similarly, the second protrusion 17, the second shelf 15, and the second side 13 of the main body 4 of the gear tooth 10 are all positioned between the second plane 23 and the axial centerline CL of the main body 4. This insures that the protrusions 16, 17 and shelves 14, 15 of each gear tooth 10 do not catch or interfere with the other gear teeth in any way.

With reference to FIG. 4, for ease of manufacture and mold integrity, it is preferred that the first sidewall 18 is substantially parallel to the centerline CL and furthermore that the first sidewall 18 and the first shelf 14 are substantially perpendicular to each other. Furthermore, it is also preferred, for the same reasons, that the second shelf 15 and the second sidewall 19 are formed substantially perpendicular to each other. The first lead-in portion 9 extends angularly from the first and second sidewalls 18, 19. Further, the first lead-in-portion 9 is generally tapered, which is formed by the converging first and second sliding surface 20, 21.

With continuing reference to FIG. 4, the operation of the gear teeth 10, 10 sliding into operative engagement is shown by the arrows. The teeth 10, 10 move first toward each other along the arrows that are parallel to the centerline CL as the corresponding gears slide toward each other. Once the sliding surfaces 21 of the two engaging teeth 10, 10 come into physical contact, the teeth 10, 10 move along the arrows that are parallel to the sliding surface 21. Because the protrusion 17 is positioned between the second plane 23 and the axial centerline CL of the main body 4 as described above, the sliding motion parallel to the sliding surface 21 will not create any physical interference. Only the desired contact between sliding surfaces will occur.

With reference now to FIGS. 1–4, a gear 1 having teeth 10 as just described can be easily formed as follows. First, powdered metal is added to a gear mold (not shown) that is adapted to form such a gear 1. Next, the powdered metal within the mold is compacted by any means chosen with sound engineering judgment. The compacting process forms a "green" gear having a plurality of teeth 10 where each tooth 10 may include a first tool shut off shelf 14. A green gear is a gear not yet heated as required to fully integrate the powdered metal into a single component. The tool shut off shelves 14 are adapted to not interfere with a similarly formed gear 2 in sliding engagement as explained above. Finally, the green gear 1 is sintered (heated) in any manner chosen with sound engineering judgment to fully compact the powdered metal of the green part into a solid mass. Again it is to be noted that this method makes moot the otherwise required step of machining or otherwise removing or minimizing the tool shut off shelves 14 on the gear teeth 10.

Figure 6:
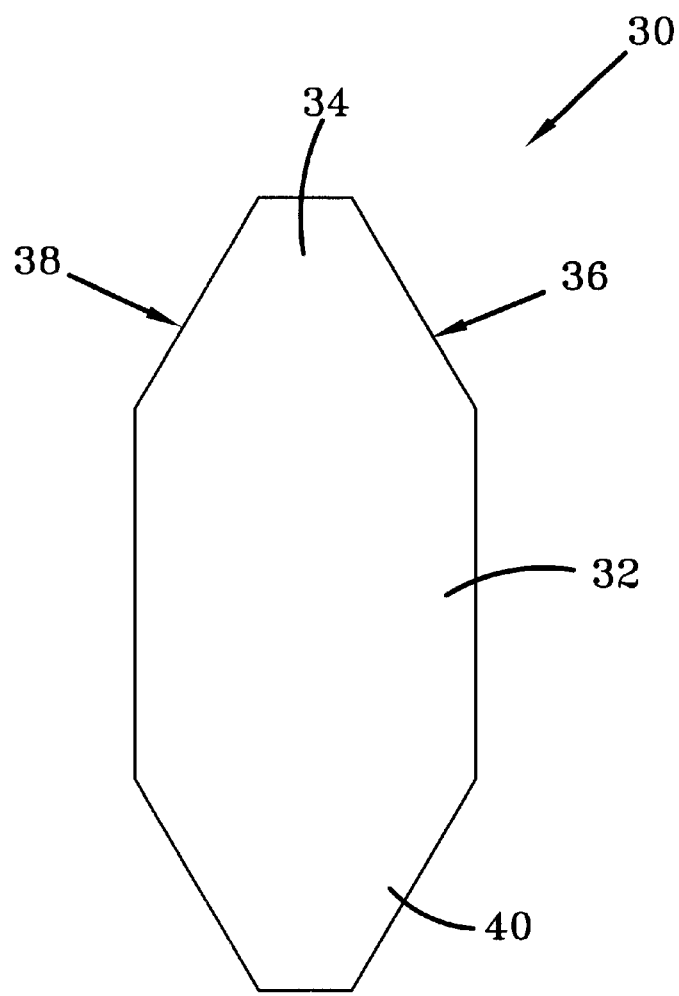
FIG. 6 is a top view of another embodiment showing a gear tooth without a tool shelf.

With reference now to FIG. 6, another embodiment of this invention is shown. The inventors have discovered that by using precise tooling and manufacturing processes, the tool shut off shelves (shown with reference numerals 14 and 15 in FIG. 4) can be reduced in size to the point where they are substantially, eliminated. The side walls (shown with reference numerals 18 and 19 in FIG. 4) can similarly be reduced in size to the point where they are substantially eliminated. The resultant gear tooth 30, made according to the same PM process, is shown in FIG. 6. This gear tooth 30 includes a main body 32 and a first lead-in portion 34 that extends from the main body 32. The first lead-in portion 34 has first and second sliding surfaces 36, 38 for slidably intermeshing with a similarly shaped gear tooth. The gear tooth 30 may also include a second lead-in portion 40. As can be easily observed, this gear tooth 30 will not have any type of interference problem in slidingly intermeshing with another similarly formed gear tooth.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A gear tooth comprising:

a main body including,
   a) first and, second ends; and,
   b) first and second sides forming first and second protrusions with said first end;

a first lead-in portion extending from said first end of said main body, said first lead-in portion including,
   a) first and second side walls extending from said first end of said main body, said first side wall defining a first shelf on said first end of said main body; and,
   b) first and second sliding surfaces extending from said first and second side walls respectively, said first sliding surface lying on a first plane;

wherein said first protrusion, said first shelf and said first side of said main body are positioned between said first plane and an axial centerline CL of said main body.

2. A gear comprising:
a plurality of teeth each having,
a main body including,
   a) first and second ends; and,
   b) first and second sides forming first and second protrusions with said first end;
a first lead-in portion extending from said first end of said main body, said first lead-in portion including,
   a) first and second sidewalls extending from said first end of said main body, said first sidewall defining a first shelf on said first end of said main body, said first sidewall being substantially perpendicular to said first shelf; and,
   b) first and second sliding surfaces angularly extending from said first and second sidewalls respectively, said first sliding surface laying on a first plane;
wherein said first protrusion, said first shelf and said first side of said main body are positioned between said first plane and an axial centerline CL of said main body, said first sidewall being substantially parallel to said axial centerline CL.

3. The gear of claim 2 being formed out of powdered metal.

4. The gear of claim 2 wherein said second side wall defines a second shelf on said first end of said main body.

5. The gear of claim 4 wherein said second shelf and said second side wall are substantially perpendicular.

6. The gear of claim 2 wherein said second sliding surface lies on a second plane, wherein said second protrusion, said second shelf and said second side are positioned between said second plane and said axial centerline CL of said main body.

7. The gear of claim 2 further comprising a second lead-in portion.

8. A method of forming a gear comprising the steps of:
adding powdered metal to a gear mold;
compacting the powdered metal within the gear mold;
forming a green gear having a plurality of teeth each having at least a first tool shut off shelf wherein said tool shut off shelf is adapted to not interfere with a similarly formed gear in sliding engagement; and,
sintering the green gear, wherein the step of forming a green gear having a plurality of teeth each having at least a first tool shut off shelf wherein said tool shut off shelf is adapted to not interfere with a similarly formed gear in sliding engagement, comprises the step of:
forming the green gear to have
   A. a main body including,
      a) first and second ends; and,
      b) first and second sides forming first and second protrusions with the first end;
   B. a first lead-in portion extending from the first end of the main body, the first lead-in portion including,
      a) first and second sidewalls extending from the first end of the main body, the first sidewall defining a first shelf on the first end of the main body, said first sidewall being substantially perpendicular to said first shelf; and,
      b) first and second sliding surfaces angularly extending from the first and second sidewalls respectively, the first sliding surface lying on a first plane; and,
   C. wherein the first protrusion, the first shelf and the first side of the main body are positioned between the first plane and an axial centerline CL of the main body, said first sidewall being substantially parallel to said axial centerline CL.

9. A gear tooth comprising:
a main body;
a first lead-in portion extending from said main body, said first lead-in portion including first and second sliding surfaces, said first and second sliding surfaces being generally tapered; and,
wherein said gear tooth is formed out of powdered metal.

10. A gear tooth comprising:
a main body including,
   a) first and second ends; and,
   b) first and second sides forming first and second protrusions with said first end;
a first lead-in portion extending from said first end of said main body, said first lead-in portion including,
   a) first and second sidewalls extending from said first end of said main body, said first sidewall defining a first shelf on said first end of said main body, said first shelf being substantially perpendicular to said first sidewall; and,
   b) first and second sliding surfaces angularly extending from said first and second sidewalls respectively, said first sliding surface lying on a first plane;
wherein said first protrusion, said first shelf and said first side of said main body are positioned between said first plane and an axial centerline CL of said main body, said first sidewall being substantially parallel to said axial centerline CL.

11. The gear tooth of claim 10 being formed out of powdered metal.

12. The gear tooth of claim 10 wherein said second sidewall defines a second shelf on said first end of said main body.

13. The gear tooth of claim 12 wherein said second shelf and said second side wall are substantially perpendicular.

14. The gear tooth of claim 10 wherein said second sliding surface lies on a second plane, said second protrusion, said second shelf and said second side being positioned between said second plane and said axial centerline CL of said main body.

15. The gear tooth of claim 10 further comprising a second lead-in portion.

* * * * *